United States Patent
Leung

(10) Patent No.: US 6,932,947 B2
(45) Date of Patent: Aug. 23, 2005

(54) FLUID PURIFICATION AND DISINFECTION DEVICE

(75) Inventor: Chan Ming Leung, Hong Kong SAR (CN)

(73) Assignee: Environmentalcare Ltd., Hong Kong (HK)

( * ) Notice: Subject to any disclaimer, the term of this patent is extended or adjusted under 35 U.S.C. 154(b) by 113 days.

(21) Appl. No.: 10/434,492

(22) Filed: May 7, 2003

(65) Prior Publication Data

US 2003/0209501 A1 Nov. 13, 2003

(30) Foreign Application Priority Data

May 9, 2002 (HK) .......................................... 02103519

(51) Int. Cl.[7] .................................................. C02F 1/32
(52) U.S. Cl. .................................... 422/186.3; 502/350
(58) Field of Search ....................... 422/186.3; 502/350; 210/153

(56) References Cited

U.S. PATENT DOCUMENTS

| | | | | |
|---|---|---|---|---|
| 4,956,754 | A | * | 9/1990 | Chen .......................... 362/101 |
| 6,251,264 | B1 | | 6/2001 | Tanaka et al. |
| 6,315,963 | B1 | * | 11/2001 | Speer ....................... 422/186.3 |
| 6,547,963 | B1 | * | 4/2003 | Tsai ............................ 210/232 |

FOREIGN PATENT DOCUMENTS

| | | |
|---|---|---|
| CN | 1187755 | 6/1998 |
| CN | 1269330 | 10/2000 |
| CN | 2408414 | 11/2000 |
| JP | 11290844 A1 | 10/1999 |
| JP | 20032575 A1 | 11/2000 |
| JP | 2000-342243 | 12/2000 |
| WO | WO 96/37281 A1 | 11/1996 |

* cited by examiner

Primary Examiner—Betsey Morrison Hoey
(74) Attorney, Agent, or Firm—Townsend and Townsend and Crew LLP

(57) ABSTRACT

The present invention discloses a fluid purification and disinfection system, which includes a housing, an ultraviolet lamp and a photocatalytic oxidation device. Said housing therein is an enclosed case that is fitted with an inlet and an outlet. Furthermore, said ultraviolet lamp is mounted inside the housing. Said photocatalytic oxidation device is a disinfection core coated with photocatalyst. Said disinfection core is installed around said ultraviolet lamp, and is fixed onto said housing. Said photocatalyst therein is titanium dioxide. The working principle of the fluid purification and disinfection device in accordance with the present invention is to utilize ultraviolet light to irradiate the titanium dioxide-coated surface of the photocatalytic oxidation device to generate the photocatalytic oxidation process. As a result, *Escherichia coli*, Vibriocholerae and pathogenic organisms that contact the surface of photocatalytic oxidation device can be quickly killed, and contaminants in the fluid can be eliminated. By this way, water or fluid that flows through said disinfection device is disinfected and purified.

13 Claims, 4 Drawing Sheets

FLUID PURIFICATION AND DISINFECTION DEVICE

FIELD OF INVENTION

The present invention is related to a method and apparatus for the purification and disinfection utilizing photocatalytic oxidation process between ultraviolet light and titanium dioxide.

BACKGROUND OF INVENTION

Pathogenic microbes, organic and inorganic pollutants are commonly found in water of various sources. Disinfection and purification of water are required for direct human consumption as well as for industrial and agricultural processes that produce products to be consumed by human or animals. Numerous ways have been used to disinfect water, for example, chlorination and ozonation. It is already known that radicals produced by photocatalytic oxidation process can oxidize organic pollutants contained within water. Hydroxyl radical, one of the end products of the above photocatalytic reaction is an extremely potent oxidizing agent as compared to chlorine and ozone and is capable of oxidizing all organic compound. Furthermore, hydroxyl radicals also kill and breakdown microorganisms.

Photocatalyst that have been demonstrated for the destruction of organic pollutants in fluid include but are not limited to $TiO_2$, $ZnO$, $SnO_2$, $WO_3$, $CdS$, $ZrO_2$, $SB_2O_4$ and $Fe_2O_3$. Titanium dioxide is chemically stable and has a suitable bandgap for UV/Visible photoactivation, and is relatively inexpensive. Therefore, phototocatalytic chemistry of titanium dioxide has been extensively studied over the last thirty years for removal of organic and inorganic compounds from contaminated air and water.

WO 9637281 describes an apparatus for purifying air by means of an activated photocatalyst such as titanium dioxide. The apparatus comprises circulating means such as a fan to circulate air through a filter. The filter is coated with photocatalysts electrostatically fixed to a fibrous porous support with a light source to activate the photocatalyst. The shape of the filter is limited to flat shapes and only one side of the filter is exposed to light source. Though electrostatic force can hold photocatalyst strongly, however, loss of photocatalyst still occurs over time.

JP 11290844 discloses a water purifying apparatus that utilizes flowing force of the inward fluid to revolve a large number of ceramic balls having titanium dioxide applied to the surfaces with ultraviolet source fixed at the four sides of the container. Due to the random motion of the ceramic balls within the container, the radicals produced by photocatalytic oxidation reaction is not evenly distributed within the fluid and therefore reduces the efficiency of the purifying action.

JP 2000325750 describes a fluid purifying method that utilizes a freely movable support structure applied with photocatalyst. The support structure moves in response to the flowing force of an inflow fluid so that the purified fluid can be successfully torn off from the photocatalyst for more efficient purifying action. However, the method requires a sufficient flow force to initiate and sustain the movement of support structure which implies a relatively high flow rate of the fluid is required and therefore shorter contact time between fluid and free radicals.

It is an object of the present invention to provide an improved apparatus for purifying water.

SUMMARY OF INVENTION

In accordance with the present invention, there is provided an apparatus for purifying fluid including a container with an inlet and outlet, an ultraviolet illuminating means mounted within the container and a disinfectant core coated with titanium dioxide. The arrangement and configuration of the above three elements in different embodiments of the present invention maximizes total effective contact surface area without compromising contact time of the fluid with the radicals.

In the preferred embodiment, the disinfectant core comprises of a spiral shaped plate coated with titanium dioxide on both side. The plate is disposed fixedly and circumferentially around the ultraviolet illuminating means within the container to form a spiral conduit with the walls of the container. The inner surface of the container is also coated with titanium dioxide and is adapted for exposure to ultraviolet ray from the ultraviolet illuminating means to maximize the total effective contact surface area. The inlet and the outlet of the apparatus is also coated with titanium oxide to further maximize the total effective contact surface area. The above-mentioned apparatus with a titanium dioxide coated surface of at least 200 square centimeters can inactivate 99.9% of the microbes in the fluid with a flow rate at 1 to 3 gallon per minute.

The above embodiment can be further scaled up by utilizing three ultraviolet lamps together with an increase in the inner diameter of the container. The scaled up embodiment can provide a surface area of at least 26,000 square centimeters coated with titanium dioxide and inactivate 99.9% of microbes within the fluid with a flow rate at 110–140 gallons per minute.

In another embodiment, the disinfectant core comprises one or more meshes reversibly attached within the container to form individual zones. The meshes are coated with titanium dioxide where the size and the number of individual zones are adjustable such that the level of the purification may be easily manipulated. The individual zones are fillable with glass beads coated with titanium dioxide. The number of glass beads within each individual zone is also adjustable. With the above arrangements of the individual zones and the number of glass beads in each individual zone, the level of purification may be easily manipulated depending on the user's need. Furthermore the inner surface of the container, the inlet and the outlet can also be coated with titanium dioxide to further increase the total effective contact surface area.

The advantage of the instant invention is that the total effective contact surface area and the contact time of the fluid with free radicals are maximized by utilizing all the surfaces within the apparatus that come into contact with the fluid. Secondly, the level of purification can be easily manipulated by adjusting the surface area of the disinfectant core by varying the total effective contact surface using the second embodiments.

DETAILED DESCRIPTION

The present invention provides an apparatus that purifies fluid by employing a photocatalytic oxidation process comprising a container with an inlet, an outlet, an ultraviolet illuminating means and a disinfectant core. The working principle of the fluid purification according to the present invention is to utilize ultraviolet light to irradiate the titanium coated surface of the apparatus to generate the photocatalytic oxidation process. The photocataylitic oxidation process generates radicals such as hydroxyl radicals, hydrogen peroxide, superoxide, conduction band electron and variance band hole. The term "purifying" or "purification" used in the following description and in the claims means purification or disinfection of the fluid by the process of photocatalytic oxidation within the apparatus. The above-mentioned purifying and disinfecting actions include but are not limited to the oxidation and decomposition of inorganic or organic compound(s), antibacterial and antimicrobial activities such as killing of *Eschericheria Coli* (*E. Coli*), *Vibriocholerae, Lactobacillas acidophillius, Saccharomyces cerevisae* and other pathogenic organism in the fluid.

The purification level of the resulting fluid depends on the total effective contact surface area and the contact time of the fluid with the free radical. The total effective contact surface area is defined as the surface area of the apparatus coated with titanium dioxide that comes into contacts with the fluid during operation. Contact time is defined as the length of time that the free radicals contact with fluid molecules during operation. A longer contact time and or a larger total effective contact surface area will result in a higher level of purification of the fluid. Contact time and total contact surface area are two independent variables and one can change either one or both variables to adjust the purification of the resulting fluid depending on the need.

Figure 1:
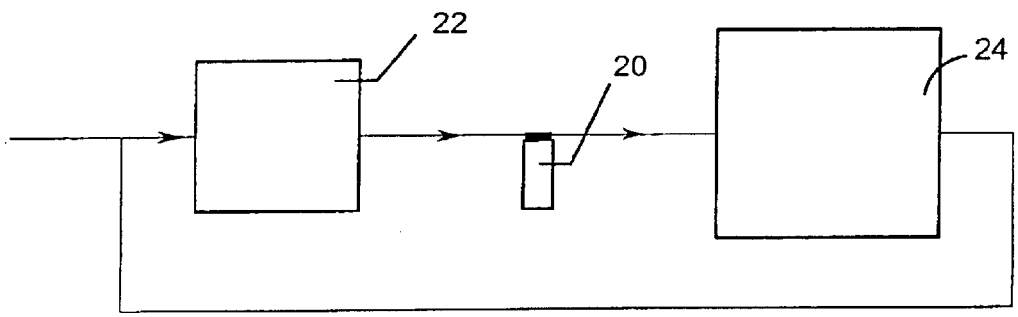
FIG. 1 is a schematic illustration showing the integration of the apparatus into a common water treatment system.

The present invention can be applied in various practical applications including but not limit to drinking water treatment systems, aquariums, seawater and freshwater fish tanks, swimming pools, fluid disinfection systems, commercial and industrial water supply systems, waste water treatment systems and sewage treatment systems. FIG. 1 illustrates one example of how the apparatus can be incorporated for a common water treatment. The untreated water passes through the filter system 22, and the filtered water then passes through the fluid purifying apparatus 20 of present invention to decompose organic and inorganic contaminants and kill the microorganisms by photocatalytic oxidation of ultraviolet and titanium dioxide to ensure that the water is safe and reliable before leaving the water treatment system 24.

A sol-gel method as described by Yu et al. (Applied Catalysis B: Environmental 36 (200) 31–43) and incorporated herein by reference in its entirety is used to produce titanium coating of the present invention with high photocatalytic activity characterized by a porous structure and large specific contact area of titanium dioxide particles with diameters in nanometer range. The surface coated with titanium dioxide can be made of material including but are not limited to glass, quartz, soda lime glass, stainless steel, metalloid and clay.

Basically, the sol-gel method for preparing titanium dioxide coating of the present invention contains the following steps:

1. Dissolve titanium isopropoxide and triethanolamine in absolute ethanol. Stir the solution vigorously for 1 hour at room temperature for hydrolysis. Add mixture of water and ethanol in drops to the solution under stirring. The resulting titanium dioxide solution can be used after 2 hours. The molar ratio of the reactants is as follow:

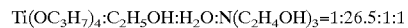

$Ti(OC_3H_7)_4:C_2H_5OH:H_2O:N(C_2H_4OH)_3=1:26.5:1:1$

2. Coat the substrate with several thin films of titanium dioxide by dipping method. The withdrawal speed is 4 mms$^{-1}$.
3. Calcine the substrate coated with titanium dioxide in air at a rate of 10° C. min$^{-1}$ up to 500° C. and leave the substrate in the furnace at 500° C. for 1 hour.

Employing this new technology of titanium dioxide coating as described herein, the present invention can maximize the total effective contact surface area without compromising the fluid flow rate.

Figure 2A:
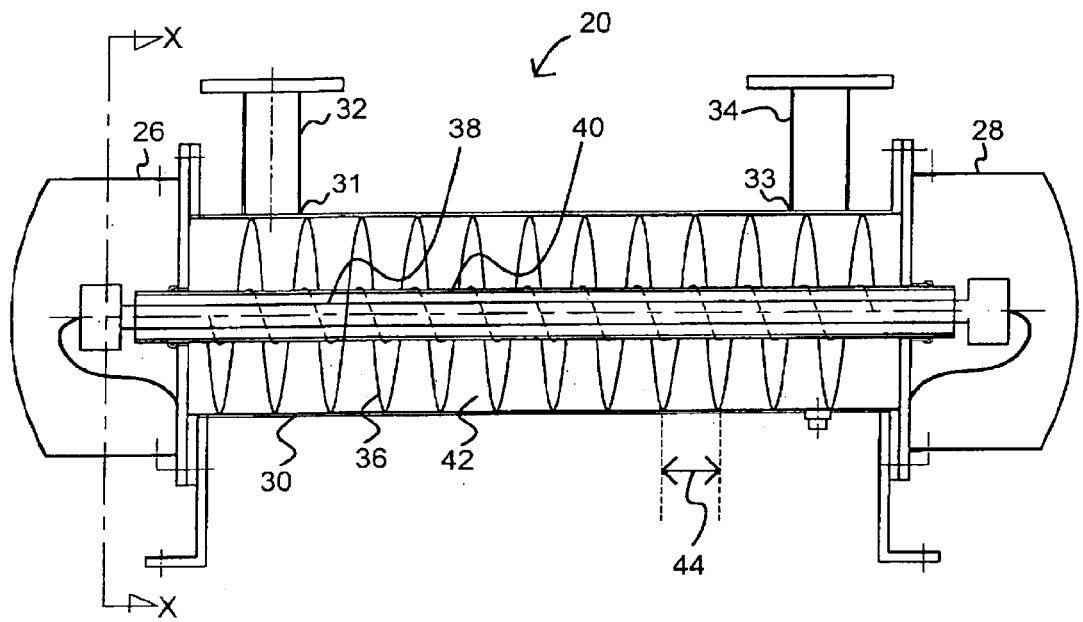
FIG. 2A is a schematic illustration showing the spiral shape disinfectant core coated with titanium dioxide surrounding the ultraviolet illuminating means according to one preferred embodiment of the present invention.
Figure 2B:
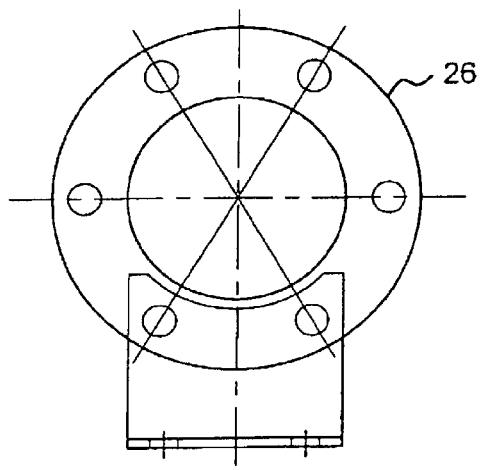
FIG. 2B is the cross-sectional view along line X—X of the same embodiment as FIG. 2A.

Referring to FIG. 2A and FIG. 2B, the device 20 according to one preferred embodiment include two seal lid, 26 and 28 on each end of a container 30 with an inlet 32 on one end 31 and an outlet 34 on the other end 33 of the container 30. The disinfectant core is a spiral shape metal plate 36 with titanium dioxide coating on both sides and installed around the ultraviolet illuminating means 38. The ultraviolet illuminating means 38 is an elongated ultraviolet lamp aligned axially along the central axis of the container 30. In order to protect the ultraviolet illuminating means against the damage induced by the fluid, the external surface of the ultraviolet illuminating means 38 is surrounded by protective sleeve 40 made of quartz or glass. The inner surface of the container 30 is also coated with titanium dioxide and is adapted for exposure of the ultraviolet ray from the ultraviolet illuminating means 38 during operation to increase the total effective contact surface area. In order to maximize the total effective contact surface area, the inner surfaces of inlet 32 and outlet 34 can also be coated with titanium dioxide.

During operation, the fluid enters container 30 through inlet 32 and flows along the spiral flow conduit 42 formed by metal plate 36 with the inner wall of the container 30. Ultraviolet light from the ultraviolet illuminating means 38 irradiates the titanium dioxide coated on the metal plate 36 and the inner wall of the container 30 to generate photocatalytic oxidation. The free radicals produced by the photocatalytic oxidation oxidize and decompose organic and inorganic contaminants in the water. The free radicals also kill microorganisms such as *E. coli, Vibriocholerae* and other pathogenic organisms in the fluid.

There are a number of factors that determine the contact time and total effective contact surface area of the fluid with the free radicals within the apparatus. The contact time and total effective contact surface area of the fluid with the free radicals will increase by increasing the total number of segments of the metal plate 36. Each segment is defined as a 360 degree turn of the spiral plate 36 i.e. in the embodiment shown in FIG. 2A, there are a total of 10 segments in the spiral shape conduit. For clarity of illustration, one segment of the spiral conduit is demonstrated by arrow 44. The contact time and total effective contact surface area of the fluid with the free radicals will also increase as the width of the metal plate 36 increases. The total effective contact surface area of the fluid and the free radicals can be easily controlled by manipulating the above-mentioned variables depending on the user's need. The contact time may be controlled by adjusting the flow rate.

The above-mentioned embodiment of the present invention can be scaled up by increasing the number of ultraviolet light illuminating means to three ultraviolet lamps 70 aligned in parallel along the central axis of the container 72. For ease of illustration, like parts similar to those found in the embodiment shown in FIG. 2A is given the same reference numbers. The width of the metal plate 74 is increased to provide a total effective surface area of 26,000 square centimeters (130 fold increase) and inactivates at least 99.9% of microbes in the fluid with a flow rate of 110–140 gallons per minute. This scaled up embodiment provides a more effective fluid purify apparatus in terms of cost and efficiency than linking three individual apparatus together in a series arrangement. This is based on the fact that the coated surface is not maximally activated by a single UV lamp.

Figure 3A:
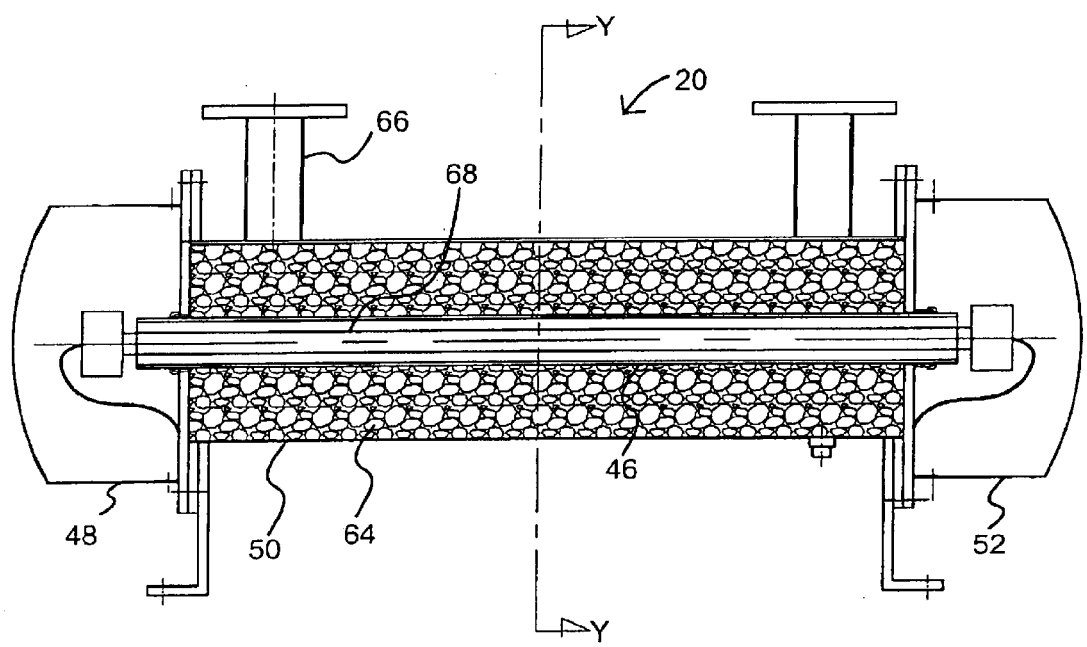
FIG. 3A is schematic illustration showing the photocatalytic coated glass beads placed at the divided compartments surrounding the ultraviolet illuminating means in another embodiment of present invention.
Figure 3B:
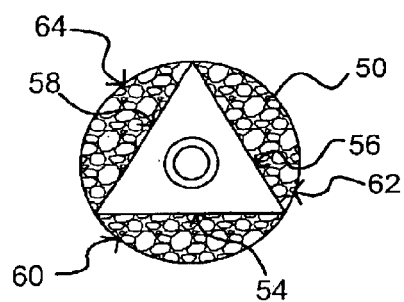
FIG. 3B is the cross-sectional view along line Y—Y of the internal structure of the same embodiment as FIG. 3A.
Figures 4A, 4B:
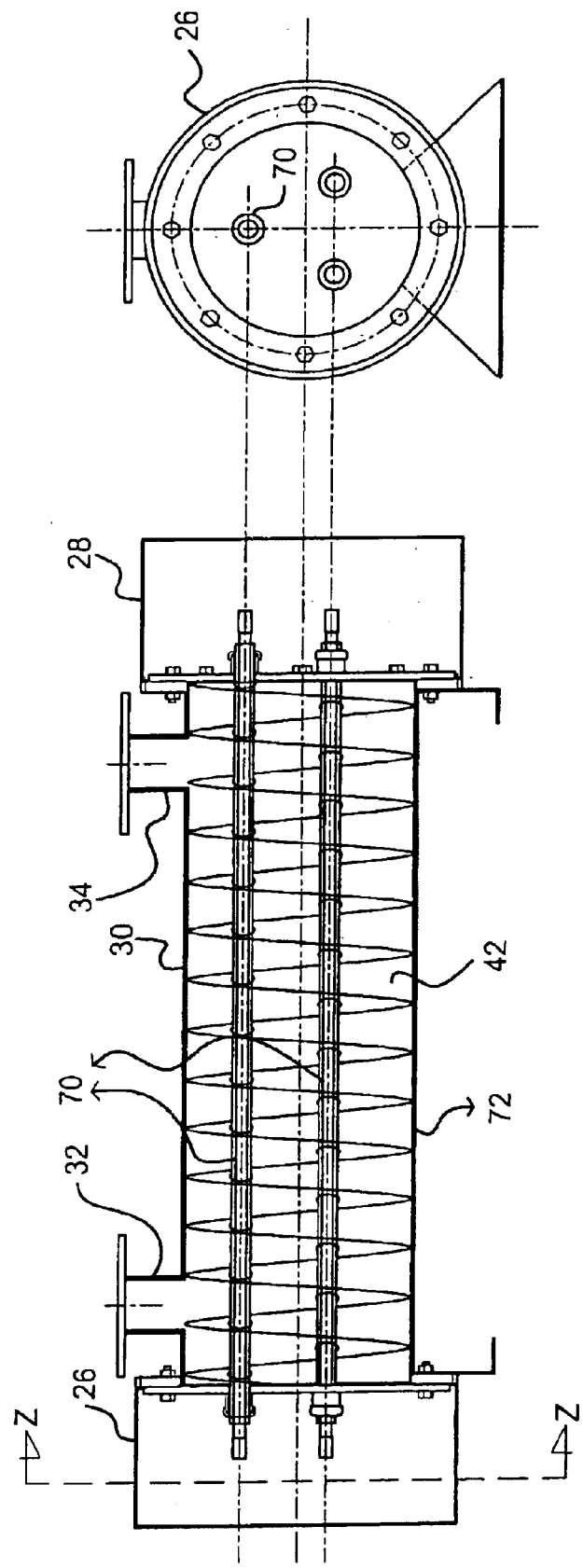
FIG. 4A is a schematic illustration showing the scaled up version of the spiral disinfectant core coated with titanium dioxide surrounding three ultraviolet lamp according to one preferred embodiment of the present invention.
FIG. 4B is the cross-section view along Z—Z of the same embodiment as FIG. 4A.

Referring to FIGS. 3A and 3B, the device 20 according to another preferred embodiment contains the disinfectant core of one or more metal meshes 46 coated with titanium dioxide on both sides. Each metal mesh 46 is reversibly attached to and extends from one end 48 of the container 50 to the other end and 52 separates the container 50 into individual zones. FIG. 3B illustrates an example of cross-section of the container utilizing three metal meshes 54, 56 and 58 to form three individual zones 60, 62 and 64. FIG. 3B is intended only to illustrate how individual zones are formed and not to restrict the number of zones to three. The number and size of each individual zone is adjustable. The metal mesh 46 itself can act as disinfectant core and each individual zone is fillable with glass beads 64 coated with titanium dioxide.

During operation, the fluid enters container 50 through inlet 66 and flows along the individual zones formed by metal mesh 46 filled with glass beads 64 coated with titanium dioxide. Ultraviolet light from the ultraviolet illuminating means 68 irradiates the titanium dioxide coated on the metal mesh 46, the glass beads 64 and the inner wall of the container 50 to generate photocatalytic oxidation. The ultraviolet illumination has been detected by ultraviolet detector at the surface. The free radicals produced by the photocatalytic oxidation oxidize and decompose organic and inorganic contaminants in the water. The free radicals also kill microorganisms such as *E. coli*, *Vibriocholerae* and other pathogenic organisms in the fluid.

The number of the glass beads and number of meshes determines the total effective contact surface area. The total effective contact surface area increases by filling in more beads in each individual zone and vice versa. Furthermore, the inner surface of the container 50 can be coated with titanium oxide to further increase the total contact surface area. The advantage of this embodiment is that the level of purification is easily manipulated by adjusting the sizes and number of individual zones and the number of glass beads in each zone depending on the user's need.

The following examples further illustrate various aspect of the present invention.

EXAMPLE 1

Preparation of Titanium Dioxide Films on Glass

The sol-gel method for preparing titanium dioxide coating of the present invention contains the following steps:

1. Titanium isopropoxide and triethanolamine were dissolved in absolute ethanol and stirred vigorously for 1 hour at room temperature for hydrolysis. Mixture of water and ethanol was then added in drops to the solution under stirring. The resulting titanium dioxide solution can be used after 2 hours. The molar ratio of the reactants is as follow:

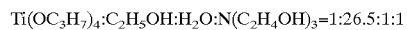

$$Ti(OC_3H_7)_4:C_2H_5OH:H_2O:N(C_2H_4OH)_3 = 1:26.5:1:1$$

2. A soda-lime glass (75 mm×25 mm×15 mm) was used as the substrate for coating was coated with titanium dioxide thin films by dipping method. The withdrawal speed is 4 mms$^{-1}$.
3. The substrate coated with titanium dioxide calcined in air at a rate of 10° C. min$^{-1}$ up to 500° C. and was left in the furnace at 500° C. for 1 hour.

EXAMPLE 2

Examination of the Surface Morphologies and Roughness of Titanium Dioxide Coating I. Purpose:

The glass filmed with titanium dioxide in Example 1 was examined to surface morphology and surface roughness of the titanium dioxide on the coated glass by AFM nano scope and X-ray diffeactometer (XRD).

II. Method:

AFM (Nano scope 3a, Digital Instrument, Santa Barbara, Calif.) was used to evaluate the surface roughness and morphologies of the titanium dioxide on the coated glass. The crystallite size of the titanium dioxide on the coated glass was determined by XRD patterns, which were obtained on a Siemens D5005 X-ray diffractometer using Cu $K_\alpha$ radiation at a scan speed of 0.400 s per step with an increment of 0.060° per step. The accelerating voltage and the applied current were 40 kV and 40 mA respectively.

III. Results:

The two- and three- dimensional AFM images show that the titanium dioxide coating has a granular microstructure and is composed of aggregated spherical particles of titanium dioxide of about 80 nm in diameter. The average crystallize of the titanium dioxide of titanium coating was 7.2 nm.

EXAMPLE 3

Antibacterial Activity of Glass Coated with Titanium Dioxide Using Sol-Gel Method I. Purpose:

The glass coated with titanium dioxide in Example 1 was examined to determine the antibacterial activity.

II. Method:

1. 1 ml of *E. coli* of two strains DH5$_\alpha$, JM 109 and XL1 Blue MRF' cell suspension with 10$^4$, 10$^5$ and 10$^6$ were pipetted individually onto the glass coated with titanium dioxide from Example 1.
2. The glass was illuminated by a 15W long wavelength Ultraviolet lamp positioned 4 cm above the glass.
3. An amount of 20 or 40 ml aliquots of serially diluted suspension were plated on duplicate LB agar plate at 10 minutes intervals.
4. The plates were then incubated at 37° C. for 24 hours and the number of colonies on the plates were counted.

III. Results:

The survival percentage of the cells of both strains decreased to zero levels after 50 minutes of ultraviolet illumination.

IV. Conclusion:

The titanium dioxide coated glass demonstrated effective antibacterial activity against *E. Coli.*

EXAMPLE 4

Performance Testing for Water Purification

I. Purpose:

The apparatus was examined for the water purification capability under a constant flow rate.

II. Method:

The apparatus as shown in FIGS. 2A and 2B with titanium dioxide coated surface on the spiral plate of 200 square centimeter was set at a throughput volumetric rate of 2 gallons per minute to treat 400 gallon of water in a total of 200 minutes. When steady rate operation was attained, one sample of the influent and another sample of effluent were collected. These two samples were analysed for two biological water quality parameters namely *E. coli* and Vibrio Spp. These test procedures were carried out with the physical filter and PCO. The analytical methods were in accordance with the procedures of American Public Health Association Standard Methods (19$^{th}$ Edition 1995).

III. Results:

The number of counts of *E. coli* was reduced by a 1000 fold and the number of Vibrio Spp. is untraceable in effluent sample.

IV. Conclusion:

The present invention demonstrated effective antibacterial activity against various microorganisms under a constant flow rate.

The foregoing descriptions of the embodiments and examples according to the present invention have been presented for the purpose of illustration and description. It is not intended to be exhaustive or to limit the invention to precise forms disclosed, as many modifications and variations are possible in the light of the teaching provided. For example, for ease of illustration, FIG. 2B shows the cross-section of a spiral metal plate as circular form. However, it should also be understood that the spiral shaped disinfectant core represents one embodiment of the present invention and the same principle of the present invention can also apply to any other shapes that can increase the total effective contact surface area and the contact time of the fluid with the free radicals such as oval, polygonal or zig-zaging shapes. The disinfectant core can also be made of any material that can be coated with titanium dioxide. Furthermore, the adjustable zones of the disinfectant core are not limited to be filled with glass beads. The zones can be filled with titanium dioxide coated objects of any size and shapes that increase the total effective contact surface area by increasing the number of objects in each zone. It is therefore intended that the scope of the invention be defined by the claims appended hereto and their equivalents.

I claim:

1. An apparatus for purifying water comprising:
   a. a container having an inlet and an outlet;
   b. ultraviolet illuminating means mounted within said container;
   c. a disinfectant core comprising a spiral shaped plate coated with titanium dioxide disposed fixedly and circumferentially around said ultraviolet illuminating means within said container to form a spiral flow conduit with the walls of said container wherein the inner surface of said container is also coated with titanium dioxide and is adapted for exposure to ultraviolet ray from the ultraviolet illuminating means during operation.

2. An apparatus according to claim 1 wherein said inlet is also coated with titanium dioxide and is adapted for exposure to the ultraviolet ray from the ultraviolet illuminating means during operation.

3. An apparatus according to claim 1 wherein outlet is also coated with titanium dioxide and is adapted for exposure to the ultraviolet ray from the ultraviolet illuminating means during operation.

4. An apparatus according to claim 1 wherein said disinfectant core providing a titanium dioxide coated surface of at least 200 square centimeters.

5. An apparatus according to claim 4 wherein fluid is dispersed along said flow at a rate of 1–3 gallons per minute and ultraviolet light in 10 watt to 15 is produced by said illuminating means during operation to generate sufficient free radical species to inactivate at least 99.9% of the microbes in said fluid.

6. An apparatus according to claim 1 wherein said ultraviolet illuminating means radiates ultraviolet ray within bandwidth (254 nm to 365 nm) radially outward for irradiating said titanium dioxide coating to generate photocatalytic oxidation process.

7. An apparatus according to claim 1 wherein said ultraviolet illuminating means is enclosed by a protecting sleeve made of quartz or glass.

8. An apparatus according to claim 1 wherein the ultraviolet illuminating means comprises three ultraviolet lamps of 120 watt to 150 watt.

9. An apparatus according to claim 8 wherein said disinfectant core providing a titanium dioxide coated surface of at least 26,000 square centimeters.

10. An apparatus according to claim 8 wherein fluid is dispensed along said flow conduit pathway at a rate of 110 to 140 gallons per minute and ultraviolet light of 120 watt to 150 watt is to produced by said illuminating means during operation to generate sufficient free radical species to inactivate at least 99.9% of the microbes in said fluid.

11. An apparatus for purifying water comprising:
    a. a container having an inlet and an outlet;
    b. ultraviolet illuminating means mounted within said container; and
    c. a disinfectant core comprising one or more metal meshes reversibly attached within said container to form individuals zones, said meshes coated with titanium dioxide; the number of said meshes and size of said individual zones being adjustable such that the level of purification may be easily manipulated, the inner surface of said container coated with titanium dioxide and adapted for the exposure to the ultraviolet ray from the ultraviolet illuminating means during operation.

12. An apparatus for purifying water comprising:
    a. a container having an inlet and an outlet;
    b. ultraviolet illuminating means mounted within said container; and
    c. a disinfectant core comprising one or more metal meshes reversibly attached within said container to form individuals zones, said meshes coated with titanium dioxide; the number of said meshes and size of said individual zones being adjustable such that the level of purification may be easily manipulated, the inlet coated with titanium dioxide and adapted for the exposure to the ultraviolet ray from the ultraviolet illuminating means during operation.

13. An apparatus for purifying water comprising:
a. a container having an inlet and an outlet;
b. ultraviolet illuminating means mounted within said container; and
c. a disinfectant core comprising one or more metal meshes reversibly attached within said container to form individuals zones, said meshes coated with titanium dioxide; the number of said meshes and size of said individual zones being adjustable such that the level of purification may be easily manipulated, said outlet coated with titanium dioxide and adapted for exposure to the ultraviolet ray from the ultraviolet illuminating means during operation.

* * * * *